Jan. 15, 1952     C. A. REIMSCHISSEL ET AL     2,582,279
CENTERING DEVICE FOR PIPE THREADING MACHINES
Filed March 12, 1946     3 Sheets-Sheet 1
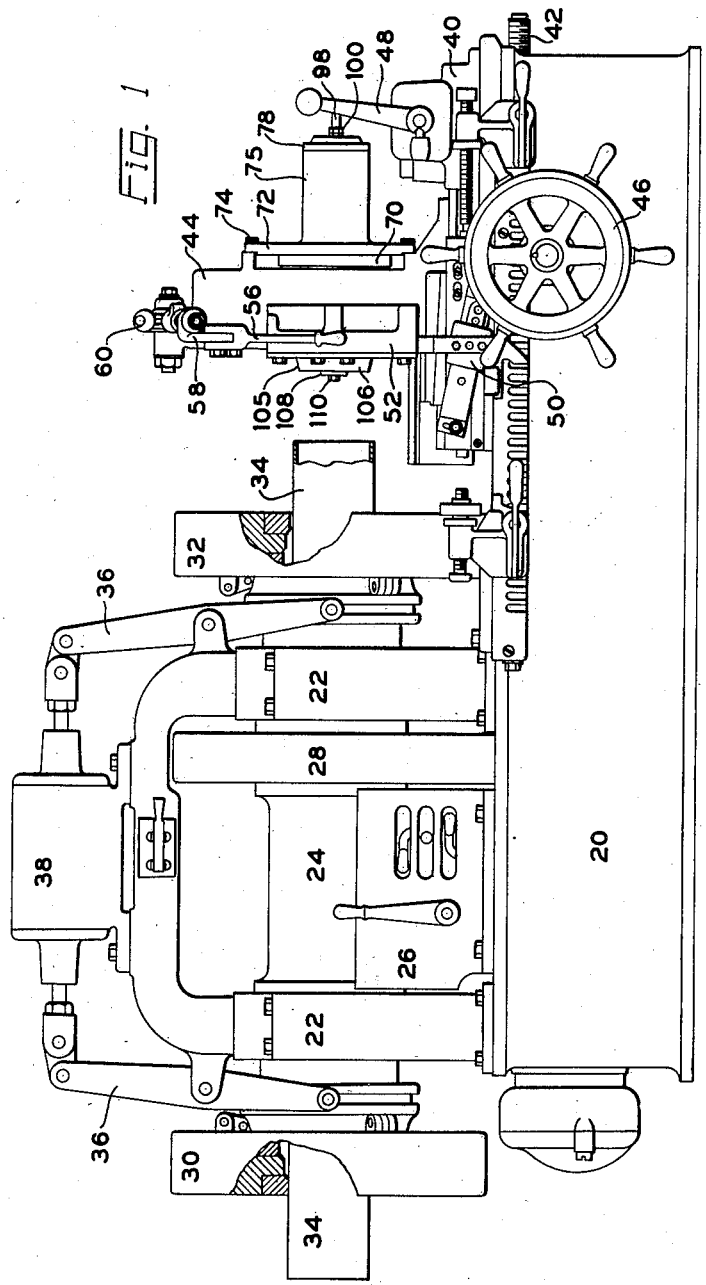
Inventor
CHARLES A. REIMSCHISSEL
HARRY E. DAVIES
By Strauch & Hoffman
Attorney Inventor
CHARLES A. REIMSCHISSEL
HARRY E. DAVIES
By Strauch + Hoffman
Attorney Jan. 15, 1952　　C. A. REIMSCHISSEL ET AL　　2,582,279
CENTERING DEVICE FOR PIPE THREADING MACHINES
Filed March 12, 1946　　　　　　　　　　　　3 Sheets-Sheet 3

Inventor
CHARLES A. REIMSCHISSEL
HARRY E. DAVIES
By Strauch + Hoffman
Attorney

Patented Jan. 15, 1952

2,582,279

UNITED STATES PATENT OFFICE 2,582,279

CENTERING DEVICE FOR PIPE-THREADING MACHINES

Charles A. Reimschissel and Harry E. Davies, Waynesboro, Pa., assignors to Landis Machine Company, Waynesboro, Pa., a corporation of Pennsylvania Application March 12, 1946, Serial No. 653,902

4 Claims. (Cl. 10—107)

This invention relates to machines for cutting threads on pipes, tubes and the like. More particularly, the invention relates to a device for positioning the pipe concentrically with the thread-cutting tools or chasers during the thread-cutting operation.

In the past, difficulties have been encountered in maintaining concentricity between the pipe and the thread-cutting chasers in such machines as that shown in United States patent to Mathias, 2,017,764, October 15, 1935. Modern methods of pipe manufacture often result in the production of lengths of pipe having a pronounced bend very near the end thereof, so that the portion of the pipe extending from the chuck of the machine toward the die head rotates eccentrically in relation to the body of the pipe which is seized between the grips of the chucks, causing the generation of an eccentric thread. It is an object of the present invention to obviate this difficulty by the provision of a device to support the end of the pipe to be threaded at the very end thereof, thus allowing the pipe to be securely gripped at only one point relatively remote from the portion to be threaded.

An eccentric pipe end will, as it rotates, impose a heavier cutting load on one or two of the cutting tools than on the remainder of the set. This condition often results in severe damage to the heavily loaded chasers or, at least, in the unduly rapid wear thereof. It is, accordingly, another object of the invention to eliminate this condition by providing mechanism to maintain the portion of the pipe to be threaded in concentric relation to the cutting tools during the entire thread-cutting operation.

When supporting a length of pipe in a holding chuck in preparation for a thread-cutting operation, the end of the pipe must necessarily extend some distance outwardly from the chuck jaws, resulting in a lack of rigidity in the end portion of the pipe where the threads are to be formed. It has been necessary, therefore, to utilize the thread-cutting chasers, collectively, as a steady rest as well as cutting tools in order to prevent "chattered" threads. This requires the chasers to be maintained in a position inwardly of the point of tangency which results in a minimum of clearance under the cutting edge of the chasers and relatively low tool life.

Therefore, it is another object of this invention to provide, for the end of the pipe, a means of support, mounted in the die head and directly interiorly of the chasers. Thus greater rigidity is provided by supporting the end of the pipe at the closest possible point to the portion being threaded. Consequently, more clearance can be provided under the cutting edges of the tools which results in freer cutting action and longer tool life.

Another important object is to prevent the collapse, due to cutting stresses, of a thin-walled tube during the thread-cutting operation, by providing a support on the interior of the tube directly adjacent the portion to be threaded.

A further object of the invention is to provide a centering device which may be adjusted to accommodate a wide variety of pipe sizes.

Other objects and advantages leading to economy of operation and excellence of product will be apparent from the following description and the annexed drawings, in which:

Figure 1 is a side elevation of a pipe threading machine showing the embodiment of the invention incorporated therein;

Figure 4:
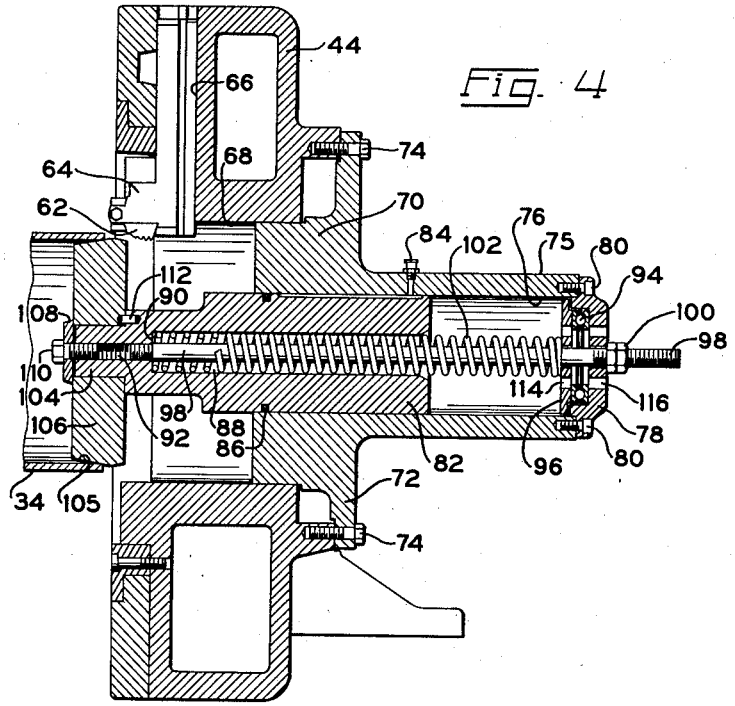
Figure 4 is a vertical sectional view taken substantially on line 4—4 of Figure 3, showing the device at the beginning of the thread-cutting operation.

With reference to Figure 1, the machine shown is generally similar to that shown and described in the above-mentioned patent to Mathias. A base or bed 20 has mounted thereupon the bearings 22, which support the rotary hollow spindle 24. This spindle is driven in conventional manner by a motor (not shown) through gearing enclosed within housings 26 and 28.

On each end of the spindle 24 is mounted a work supporting device, 30 and 32 respectively, these devices being adapted to hold the work 34 which extends through the hollow spindle 24, in proper position to be operated on by the thread-cutting elements of the machine. The devices 30 and 32 may be standard jaw-type chucks, the jaws being opened and closed through the medium of levers 36 pivotally mounted on the frame of the machine and operated in well known manner by a hydraulic or other motor 38 which may be mounted as shown at the top of the machine frame. In the use of the present invention the jaws of chuck 32 are adjusted and do not grip the pipe so that the chuck jaws serve merely as guides for one end of the pipe. The other end of the pipe remote from the die head is gripped by the jaws of the chuck 30 to transmit rotation to the pipe from spindle 24.

The thread-cutting mechanism is mounted on a carriage 40 slidably mounted on the bed 20, and a leadscrew 42 is provided for advancing the carriage on its slide in the conventional manner. Mounted on the carriage 40 is a body member 44 of the die head whose center is in axial alignment with the spindle 24 and with the chucks 30 and 32.

The machine also incorporates the handwheel 46 for manually advancing and retracting the carriage 40, the lever 48 for engaging the lead nut (not shown) with the leadscrew 42 and the sine bar mechanism, generally indicated at 50, for the production of a tapered thread. These mechanisms are fully described in the above-mentioned patent and therefore further detailed description is thought unnecessary.

Figure 2:
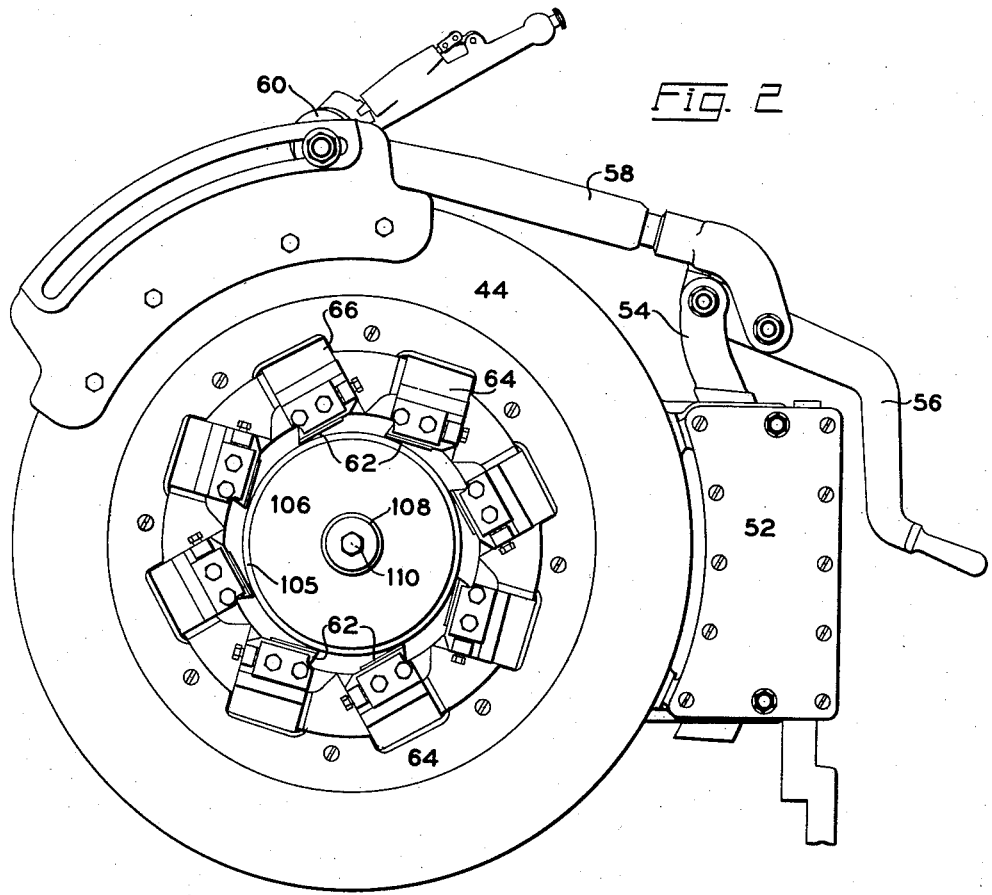
Figure 2 is a face or front elevation of the thread-cutting die head of the machine of Figure 1.

The die head body member 44 has mounted at one side thereof in the attached housing 52, the taper producing lever 54 (Figure 2), to which is attached the lever 56 for moving the thread-cutting tools into and out of operative position. The mechanism 58 for transmitting motion from levers 54 and 56 to the chasers and the mechanism 60 for permitting a roughing and a finishing operation upon the work 34 are also fully described in the Mathias patent.

The cutting operation is performed by the chasers 62 which are mounted in well known manner, such as that described in the reissue Patent No. 20,930 to C. A. Reimschissel, on the slides 64. These slides are received in the radially-directed slideways 66 in the head body 44. The construction and manner of operation of the slides 64 may be identical with that described in the above mentioned patent to Mathias.

Figure 3:
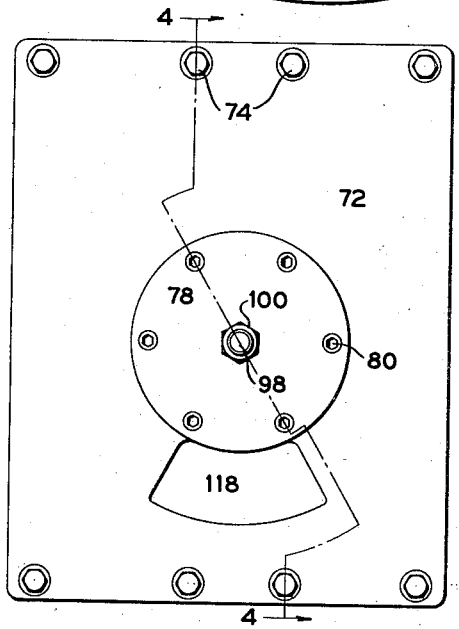
Figure 3 is a rear end elevation of the centering device.

Referring now to Figures 3 and 4, the head body 44 is provided with a central bore 68 to receive the cylindrical forward end of a bracket 70. A rectangular flange 72 is formed integrally with the bracket 70 which is secured by screws 74 to the rearward face of the head body 44. The central rearward projection 75 has its bore 76 extended through the bracket 70 and closed at its rear end by the cap member 78 removably secured in position by the screws 80.

The plunger 82 is mounted for rotary and sliding movement in the forward end of bore 76. An oiler 84 (Figure 4) is provided for the lubrication of the bearing surfaces of bore 76 and plunger 82. A conventional sealing member 86 is seated in a circumferential groove in plunger 82 for the retention of lubricant in the bore 76. Plunger 82 is formed with an axially extending bore 88 which terminates at the shoulder 90. A tapped hole 92 extends from the shoulder 90 through the forward end of plunger 82.

A thrust bearing 94 is seated in a recess in the forward or inner face of cap member 78. A plate 96 is disposed in bore 76, forwardly adjacent bearing 94 and in abutting relationship therewith. A rod 98 has a reduced end thereof threadedly engaged in the tapped hole 92 and extends rearwardly from shoulder 90 through bore 88 and through aligned openings in plate 96, bearing 94 and cap 78. The rearwardly protruding end of rod 98 is threaded for a considerable length and has engaged thereon the lock nuts 100. Within bore 88 and surrounding the rod 98, a compression spring 102 is mounted to exert pressure against plate 96 in the rearward direction and against shoulder 90 in the forward direction. Thus the plunger 82 is resiliently urged forwardly to a position determined by the adjustment of the lock nuts 100 on the rod 98, as shown in Figure 4.

Upon a reduced diameter, forward end portion 104 of plunger 82 is mounted the pilot 106, being retained in axial position by means of the washer 108 and screw 110, the latter of which is threadedly engaged in the tapped hole 92. It will be seen that the pilot 106 is preferably in the form of a disk with a frusto-conical peripheral surface 105 having its smaller end directed forwardly and extending beyond the bore 68 of the head body 44 to engage the interior circumference of the work 34. The pilot 106 is restrained from rotating relative to the plunger 82 by means of one or more dowel pins 112.

For the operation of the above-described device, the work 34 is placed, by any suitable means, in the position shown in Figure 1. The chuck 30 is then closed to grip firmly the circumference of the work 34 which has no external support in the chuck 32, so that no positive center will be established for the work at this point. The carriage 40 is then moved toward chuck 32, either by engaging the lead nut with lead screw 42 or by manipulation of the hand-wheel 46, carrying therewith the head body 44 and associated mechanism.

When these parts have arrived at the position shown in Figure 4, the conical peripheral surface of the pilot 106 engages the rotating work 34 and rotates therewith. The axial position of this engagement relative to the chasers 62 is located by adjustment of nuts 100 on rod 98. This adjustment also determines the initial resistance of the spring 102 to relative axial movement of the pilot with respect to the die head and, therefore, the ultimate pressure force transmitted to the pilot by said spring for a predetermined thread length. These pressure factors are also variable for pipes of different wall thickness by adjusting the nuts 100. It will be noted that the pilot 106 may be replaced by similar pilots of various sizes for the accommodation of a large range of pipe sizes. It should be stated that it is not absolutely essential that the pilot 106 be arranged to rotate with the work but this arrangement has been found preferable due to the fact that relative rotation between pilot and work has the tendency to smooth out and render uniform any minor irregularities in the circular cross-section of the pipe and thus to affect the continuity of the thread during its generation. During the thread-cutting operation, therefore, the pilot 106, plunger 82, rod 98, spring 102 and plate 96 rotate as a unit with the work 34.

Figure 5:
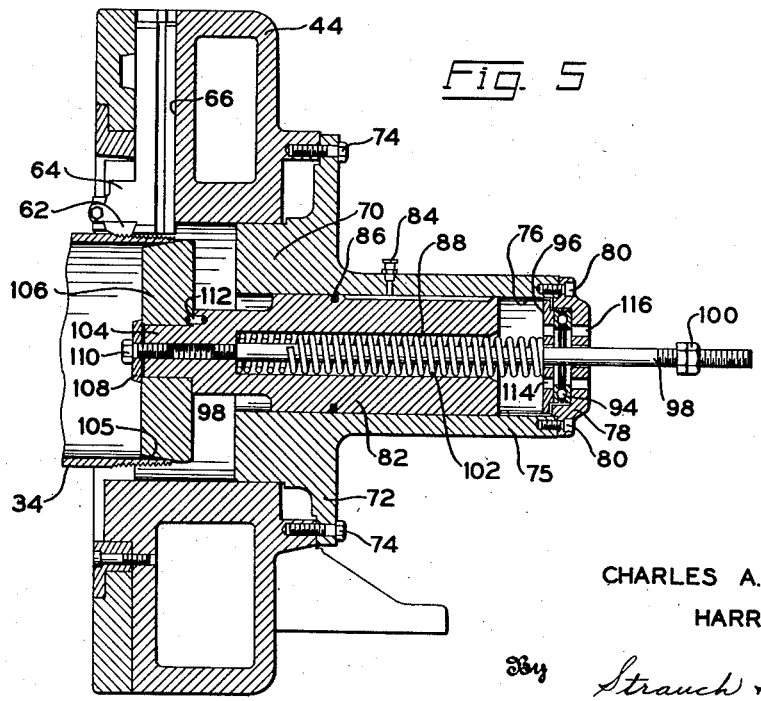
Figure 5 is a sectional view similar to Figure 4, but showing the device near the end of the thread-cutting operation.

As the die head is propelled axially toward and upon the work 34, the pressure of spring 102 maintains pilot 106 in constant engagement with the end of the work, preventing its collapse and maintaining its external circumference in exact concentric relationship with all of the chasers 62 while the thread is being cut. Meanwhile, of course, the relative axial movement of head body 44 and work 34 compresses spring 102 until pilot 106 and plunger 82 are positioned relative to the die head as shown in Figure 5, where the thread has been completely formed and the chasers 62 are about to be withdrawn radially to allow the work 34 to be removed. The entrapment and compression of air within the bore 76 is prevented by the provision, in plate 96 and cap 78, of the holes 114 and 116 respectively. It should be apparent that, although the use of spring 102 as shown and described is a convenient means for producing a forward pressure against plunger 82, any other suitable pressure means may be used.

The opening 118 (Figure 3) is provided through the flange 72 and the forward cylindrical portion of the bracket 70 for access to the cavity between bracket 70 and the pilot 106 for removal of the metal chips which collect therein during the cutting operation.

When the thread is completed, therefore, and the die head withdrawn from the work, the pilot 106 returns under pressure of spring 102 to the position shown in Figures 1 and 4 and is ready for the start of another thread-cutting cycle.

The above description contemplates the use of the device in combination with a machine in which the work is revolved while the cutting mechanism is stationary. It is obvious that the identical device may also be used in combination with a revolving die head and a stationary work holding device. It will also be evident that the novel pipe centering pilot mechanism with bracket member 70 may be readily designed for inexpensive application to existing threading machines of either type without necessitating material structural alterations thereof. The centering mechanism itself comprises a minimum number of parts of simple and rugged construction which will efficiently function to accurately center the pipe end with respect to the cutting tools and provide circumferentially uniform internal support for the pipe wall. Thus, in operating upon thin-walled pipe, collapse of the pipe wall under pressure of the tools will be prevented to insure accurate generation of the thread.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is.

1. In combination with a pipe-threading machine having an axially movable non-rotatable die head and means for rotatively supporting a pipe at one end remote from the die head and in axial alignment therewith; a bracket fixed to the die head, said bracket having a hollow cylindrical extension, and means for centering the other unsupported end of the pipe with relation to the die head, comprising a plunger rotatably and reciprocably journalled in said hollow extension in said bracket co-axially with the die head for axial movement with and independently of said head, centering means, means removably securing said centering means to the forward end of the plunger to internally engage the pipe wall at its unsupported end in the advancing movement of the die head and establish a concentric relationship between said pipe end and the die head, and resilient means coacting with said bracket and said plunger and operative upon initial contact of the centering means with the pipe end to yieldingly resist axial movement of the plunger with respect to the die head and apply an axial yielding pressure to the plunger, progressively urging said centering means into the pipe end independently of the die head in the continued advancing movement thereof.

2. In combination with a pipe-threading machine having an axially movable nonrotatable die head and means for rotatively supporting a pipe at one end remote from the die head and in axial alignment therewith; a bracket fixed to the die head, and means for centering the other unsupported end of the pipe with relation to the die head, comprising a plunger rotably journalled in said bracket coaxially with the die head for axial movement with and independently of said die head, centering means on the forward end of the plunger to internally engage the pipe wall at its unsupported end in the advancing movement of the die head and establish a concentric relationship between said pipe end and the die head, a rod fixed at one end to said plunger, an end thrust bearing mounted in said bracket, a spring surrounding said rod between said thrust bearing and said plunger and adjustable means on the rod coacting with said bracket to adjust the normal axial position of the plunger and centering means relative to the die head, and to regulate the resistance of the spring to relative axial movement of the plunger and die head upon contact of the centering means with the pipe end.

3. In combination with a pipe threading machine having an axially movable, non-rotatable die head and means remote from the die head for supporting and rotating a pipe with an unsupported end thereof in substantially coaxial relation with the die head; a pipe end centering unit and means detachably mounting said unit on one side of said die head, said unit comprising a bracket having a hollow cylindrical extension externally of the die head and substantially coaxial therewith, a plunger rotatably and reciprocably journalled in said extension in said bracket and axially movable with and relative to the die head, a pilot member rigidly secured to one end of said plunger, a thrust bearing rotatably mounted on said bracket, a rod attached to said plunger and extending through said thrust bearing and said bracket, means on said rod for adjusting the initial position of said plunger, and spring means surrounding said rod and compressed between said thrust bearing and said plunger rotatable as a unit with said plunger and operative in the advancing axial movement of the die head relative to the pipe to progressively urge said pilot into the pipe end during the thread cutting action of the dies.

4. A pipe threading machine having an axially movable, non-rotatable die head; means remote from said die head for gripping and rotating a pipe with an unsupported end thereof in substantially coaxial relation with the die head; a bracket fixed to the die head, said bracket having a hollow cylindrical extension and means for centering the other unsupported end of a pipe with relation to the die head, comprising a plunger rotatably and reciprocably journalled in said hollow extension in said bracket coaxially with the die head for axial movement with and independently of said head, centering means, means removably seecuring said centering means to the forward end of the plunger to internally engage the pipe wall at its unsupported end in the advancing movement of the die head and establish concentric relation between said pipe end and the die head, and spring means extending between said plunger and bracket and coacting therewith rotatable as a unit with said plunger and operative in the advancing axial movement of the die head relative to the pipe to progressively urge said pilot member into the pipe end during the cutting action of the dies.

CHARLES A. REIMSCHISSEL.
HARRY E. DAVIES.

REFERENCES CITED

The following references are of record in the file of this patent:

UNITED STATES PATENTS

| Number | Name | Date |
|---|---|---|
| 51,257 | Brown | Nov. 28, 1865 |
| 660,486 | Brown | Oct. 23, 1900 |
| 780,017 | Albee | Jan. 17, 1905 |
| 1,114,629 | Murchey | Oct. 20, 1914 |
| 1,304,906 | Richards | May 27, 1919 |
| 1,653,258 | Davis | Dec. 20, 1927 |
| 1,848,297 | Hyde | Mar. 8, 1932 |
| 1,872,059 | Brectenstein | Aug. 16, 1932 |
| 2,288,578 | Yeomans et al. | June 30, 1942 |
| 2,323,970 | Bird et al. | July 13, 1943 |

FOREIGN PATENTS

| Number | Country | Date |
|---|---|---|
| 437,221 | Germany | Nov. 16, 1926 |